US011965836B2

United States Patent
Tissandier et al.

(10) Patent No.: US 11,965,836 B2
(45) Date of Patent: Apr. 23, 2024

(54) ASSEMBLY FOR DETECTING DEFECTS ON A MOTOR VEHICLE BODYWORK

(71) Applicant: PROOV STATION, Lyons (FR)

(72) Inventors: Gabriel Tissandier, Lyons (FR); Cédric Bernard, Lyons (FR); Alexandre Perret-Meyer, Lyons (FR)

(73) Assignee: PROOV STATION (FR)

( * ) Notice: Subject to any disclaimer, the term of this patent is extended or adjusted under 35 U.S.C. 154(b) by 463 days.

(21) Appl. No.: 17/289,258

(22) PCT Filed: Sep. 7, 2020

(86) PCT No.: PCT/EP2020/074974
§ 371 (c)(1),
(2) Date: Apr. 28, 2021

(87) PCT Pub. No.: WO2021/048066
PCT Pub. Date: Mar. 18, 2021

(65) Prior Publication Data
US 2021/0396684 A1   Dec. 23, 2021

(30) Foreign Application Priority Data

Sep. 11, 2019   (EP) .................................. 19196820

(51) Int. Cl.
*G01N 21/95*   (2006.01)
*G01N 21/88*   (2006.01)

(52) U.S. Cl.
CPC ..... *G01N 21/9515* (2013.01); *G01N 21/8806* (2013.01); *G01N 2021/9518* (2013.01);
(Continued)

(58) Field of Classification Search
CPC ........... G01N 21/9515; G01N 21/8806; G01N 2021/9518; G01N 2201/021;
(Continued)

(56) References Cited

U.S. PATENT DOCUMENTS 4,792,232 A * 12/1988 Jobe ........................ G06T 7/521
356/394
4,918,321 A * 4/1990 Klenk ................ G01N 21/8806
250/559.05
(Continued)

FOREIGN PATENT DOCUMENTS

EP   2 386 848 A1   11/2011
EP   2 212 681 B1   12/2013
(Continued)

OTHER PUBLICATIONS

International Search Report dated Nov. 12, 2020 in corresponding PCT International Application No. PCT/EP2020/074974.
(Continued)

*Primary Examiner* — Roy M Punnoose
(74) *Attorney, Agent, or Firm* — OSTROLENK FABER LLP

(57) ABSTRACT

An assembly for detecting defects on a bodywork of a motor vehicle that includes a gantry, of inverted U-shaped cross section, shaped to allow the passage of the motor vehicle in a longitudinal direction, from the rear of the gantry to the front of the gantry. The gantry includes an inner surface extending transversely between two lateral free ends and includes a light source suitable for illuminating, the bodywork, the gantry including at least one opaque strip extending transversely over the entire length of the inner surface. The assembly includes a plurality of cameras installed at a distance from the gantry to capture images of the bodywork of the motor vehicle, and a detection member for detecting defects in the bodywork.

11 Claims, 6 Drawing Sheets

(52) U.S. Cl.
CPC . *G01N 2201/021* (2013.01); *G01N 2201/062* (2013.01); *G01N 2201/0636* (2013.01)

(58) Field of Classification Search
CPC ..... G01N 2201/062; G01N 2201/0636; G01N 21/8851; G01N 2021/8854; G01N 2201/1042; G06T 7/0004
See application file for complete search history.

(56) References Cited

U.S. PATENT DOCUMENTS

| | | | | |
|---|---|---|---|---|
| 5,436,726 | A * | 7/1995 | Ventura | G01N 21/8806 356/613 |
| 5,583,640 | A * | 12/1996 | Ventura | G01N 21/8806 356/613 |
| 5,636,024 | A * | 6/1997 | Crookham | G01N 21/8806 356/613 |
| 5,726,705 | A * | 3/1998 | Imanishi | G01N 21/8806 356/600 |
| 6,012,825 | A * | 1/2000 | Horner | F21V 7/005 362/297 |
| 6,239,436 | B1 * | 5/2001 | Parker | G01N 21/8806 250/341.8 |
| 6,266,138 | B1 * | 7/2001 | Keshavmurthy | G01N 21/88 356/600 |
| 6,320,654 | B1 * | 11/2001 | Alders | G01N 21/8806 356/237.2 |
| 6,392,754 | B1 | 5/2002 | Pingel et al. | 356/603 |
| 6,496,253 | B1 | 12/2002 | Vokhmin | 356/124 |
| 8,982,207 | B2 * | 3/2015 | Jang | B64F 5/60 901/44 |
| 10,007,981 | B2 * | 6/2018 | Gangitano | G06Q 10/20 |
| 10,036,712 | B2 * | 7/2018 | Kuai | G01N 21/8806 |
| 10,401,302 | B2 * | 9/2019 | Röckle | G01M 11/081 |
| 11,021,885 | B2 * | 6/2021 | Williams | G01B 11/167 |
| 11,560,730 | B2 * | 1/2023 | Williams | E04H 6/02 |
| 11,570,369 | B1 * | 1/2023 | Swinford | H04N 23/56 |
| 11,674,907 | B2 * | 6/2023 | Kasavala | G01B 11/254 356/237.2 |
| 2005/0125119 | A1 * | 6/2005 | Srack | G01B 5/0025 702/152 |
| 2009/0141287 | A1 * | 6/2009 | Sato | G06T 7/521 356/610 |
| 2011/0285987 | A1 | 11/2011 | Surrel | 356/237.2 |
| 2014/0070538 | A1 | 3/2014 | Bowyer et al. | 290/44 |
| 2016/0097725 | A1 * | 4/2016 | Porter | G01N 21/8806 356/237.2 |
| 2018/0187409 | A1 * | 7/2018 | Williams | G01N 21/8803 |
| 2019/0174071 | A1 * | 6/2019 | Wasner | G01N 21/8806 |
| 2020/0011808 | A1 * | 1/2020 | Ozim | G01B 11/2522 |
| 2021/0041371 | A1 * | 2/2021 | Grauzinis | G01N 21/9515 |
| 2021/0325313 | A1 * | 10/2021 | Kasavala | G01B 11/254 |
| 2021/0398271 | A1 * | 12/2021 | Lee | G06T 7/001 |

FOREIGN PATENT DOCUMENTS

| | | |
|---|---|---|
| FR | 3 075 371 A1 | 6/2019 |
| WO | WO 2006/052684 A1 | 5/2006 |

OTHER PUBLICATIONS

Written Opinion dated Nov. 12, 2020 in corresponding PCT International Application No. PCT/EP2020/074974.

* cited by examiner

[Fig. 1]
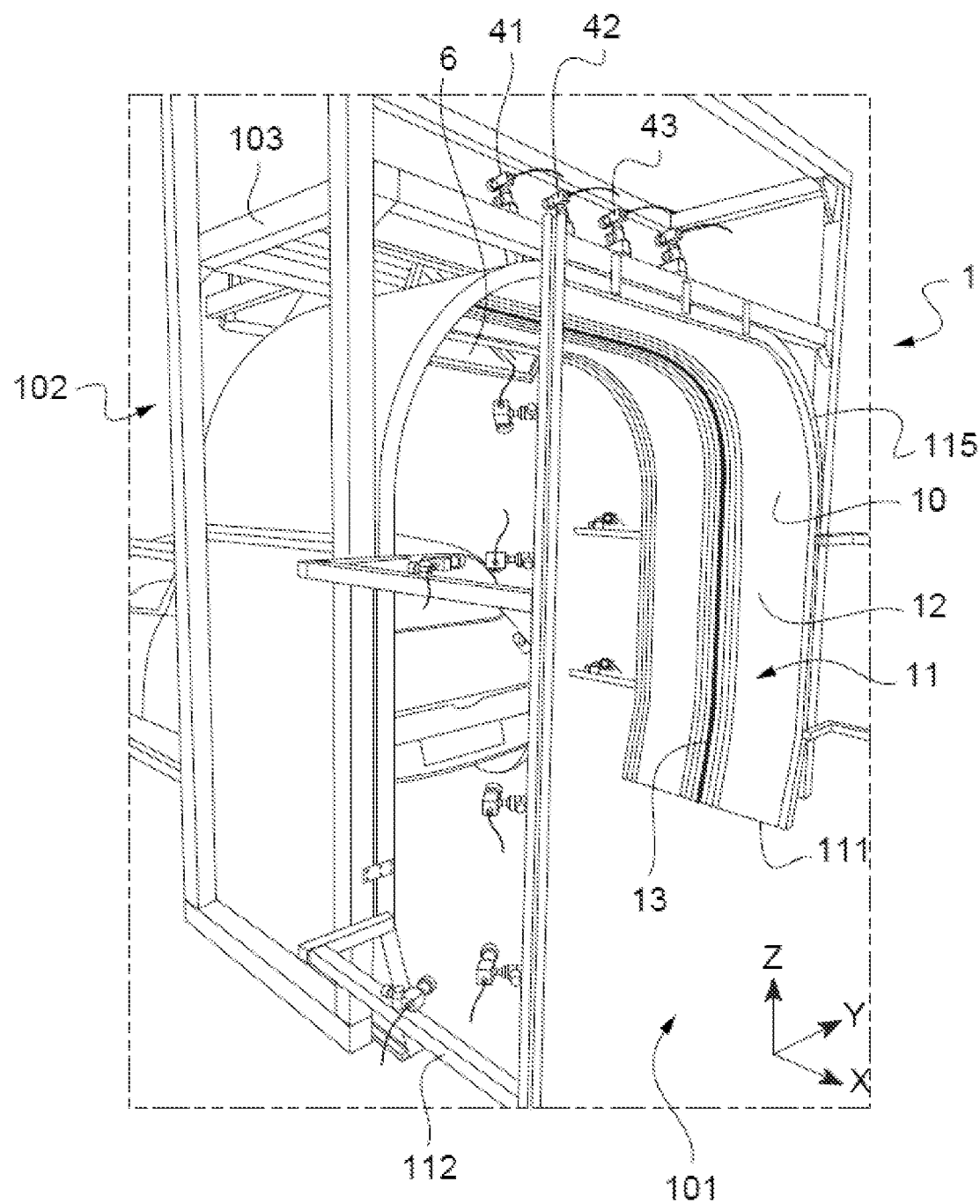

[Fig. 2]
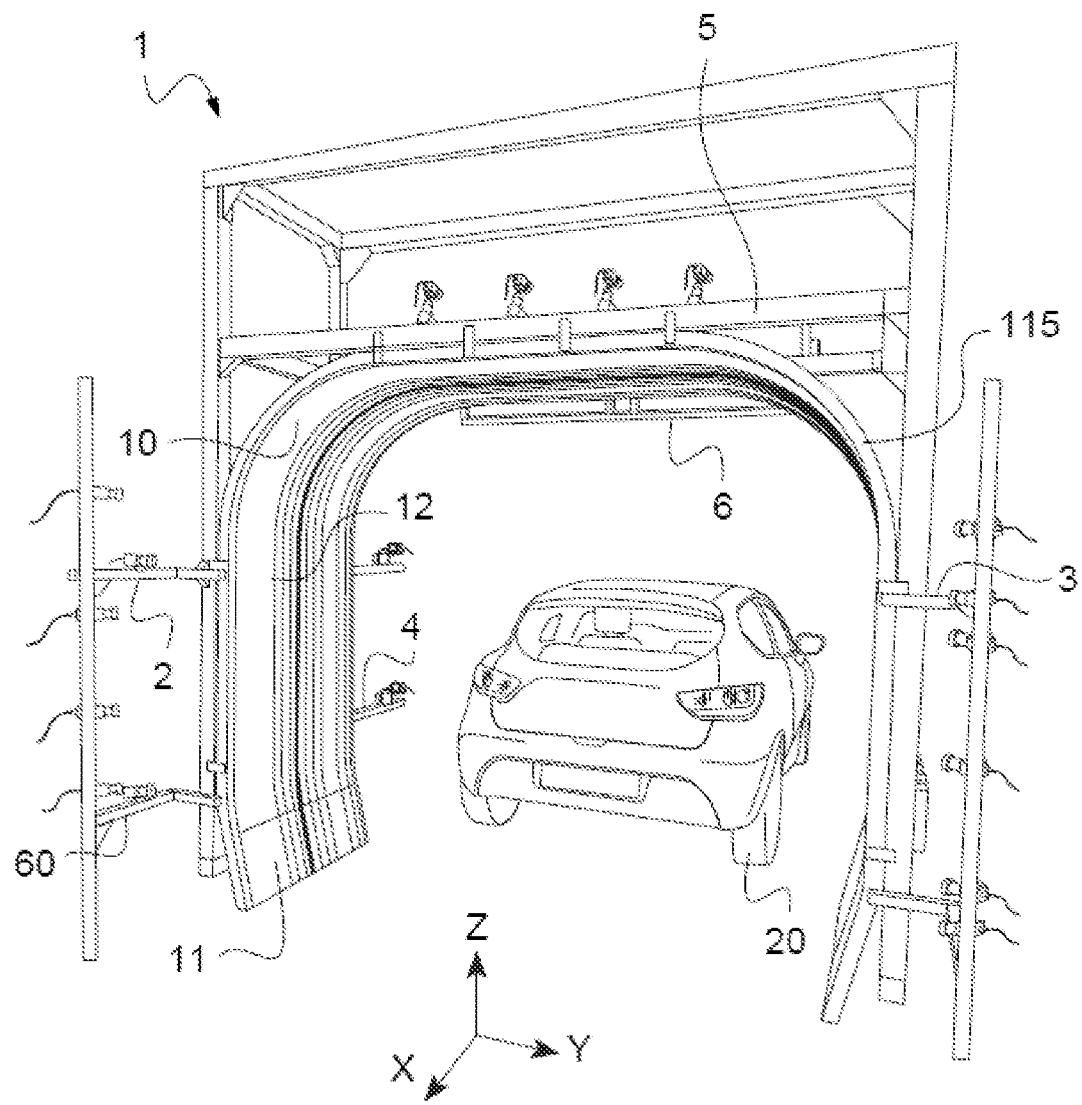

[Fig. 3]
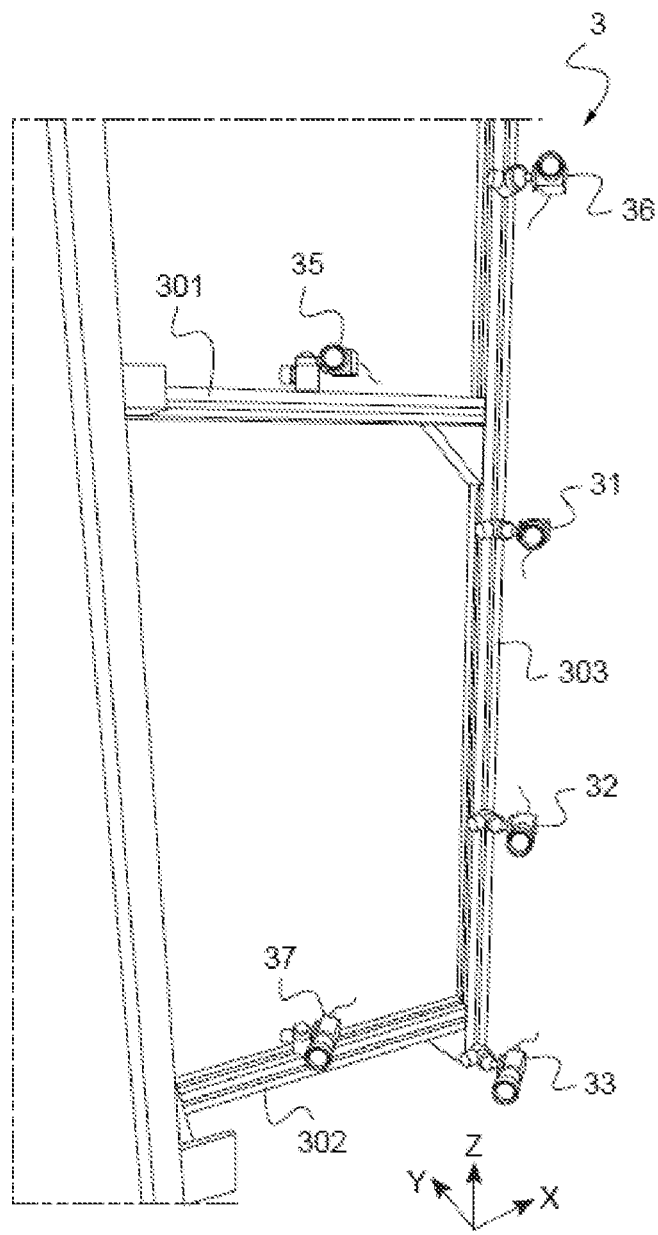

[Fig. 4]
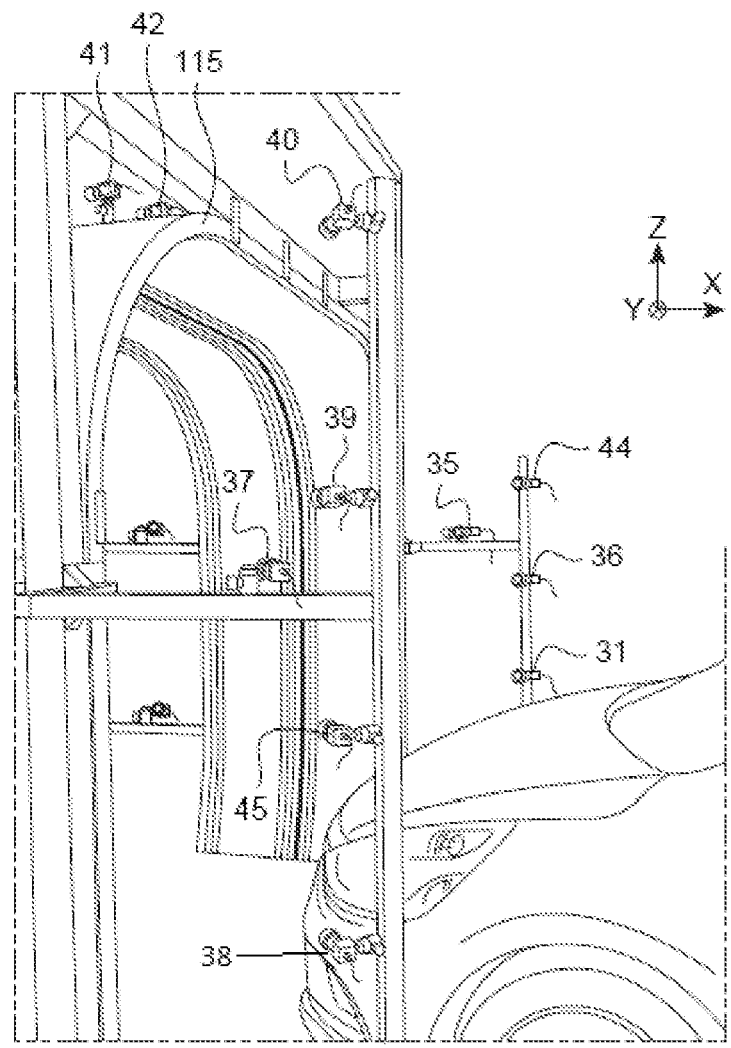

[Fig. 5]
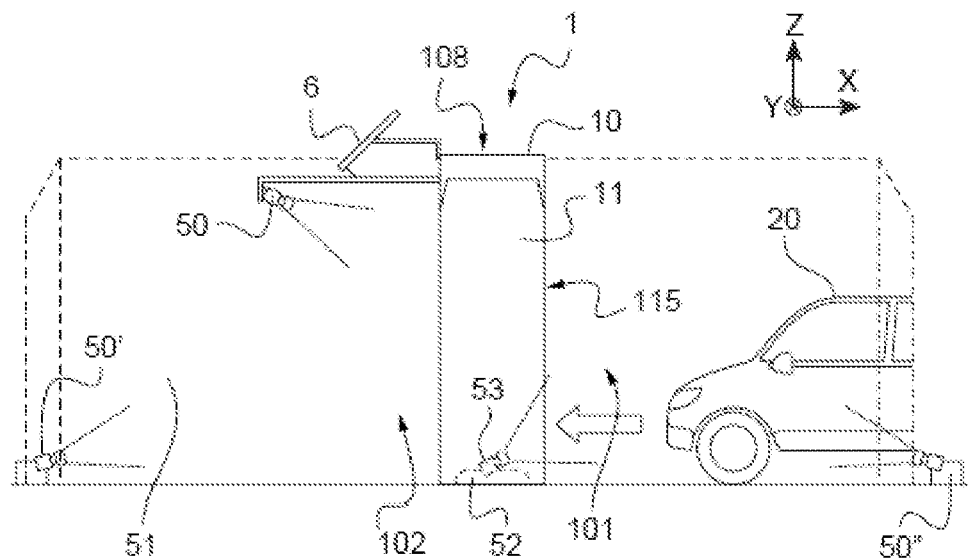
[Fig. 6]
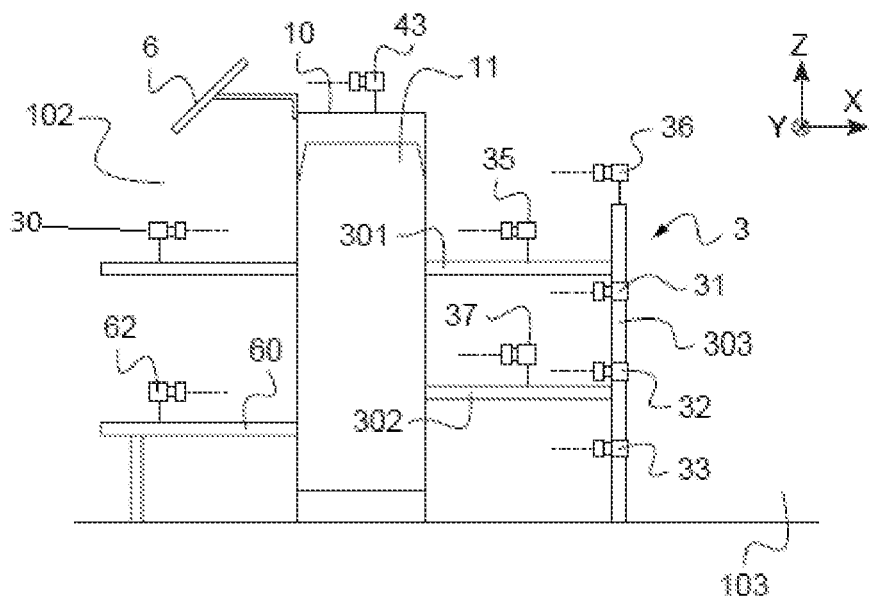

[Fig. 7a]
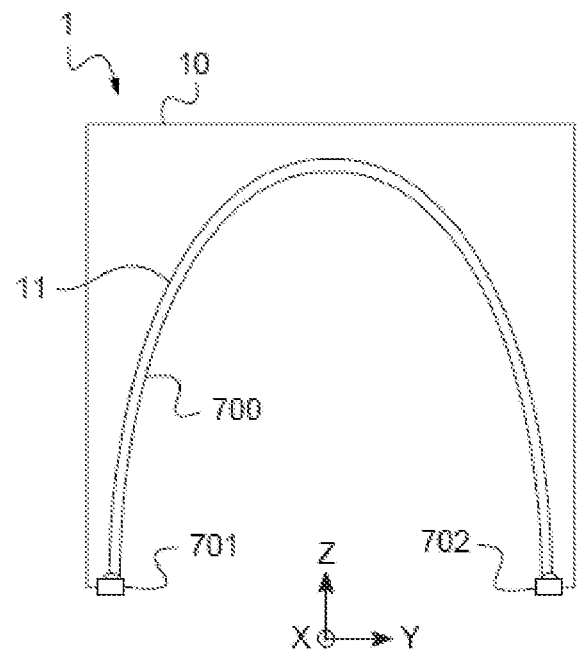
[Fig. 7b]
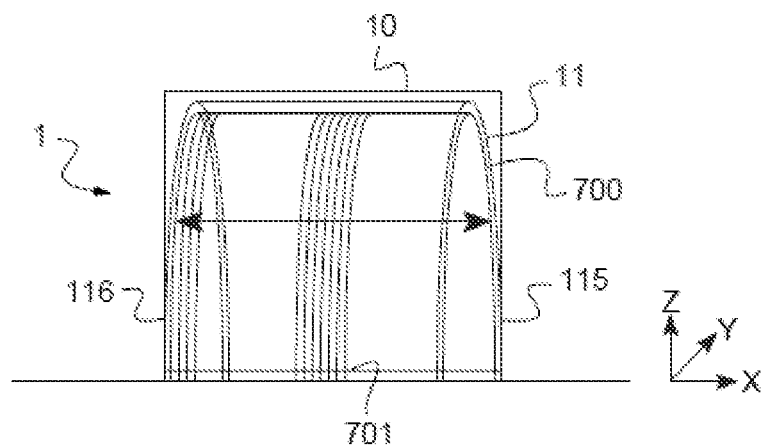

ASSEMBLY FOR DETECTING DEFECTS ON A MOTOR VEHICLE BODYWORK

CROSS-REFERENCE TO RELATED APPLICATIONS

The present application is a 35 U.S.C. §§ 371 national phase conversion of PCT/EP2020/074974, filed Sep. 7, 2020, which claims priority to European Patent Application No. 19196820.5, filed Sep. 11, 2019, the contents of which are incorporated herein by reference. The PCT International Application was published in the French language.

TECHNICAL FIELD

The present invention relates to an assembly for detecting defects on the bodywork of a motor vehicle, its understructure and potentially the tires.

BACKGROUND OF THE INVENTION

The invention applies to various uses in the automotive field.

First, the invention applies to the detection of defects on a bodywork leaving the production line.

Specifically, after the production of a motor vehicle, it is well known to those skilled in the art that quality control is carried out. This quality control aims in particular to ensure that no defect is apparent on the bodywork.

Such control is usually carried out by quality specialists who perform visual checks, which are relatively tedious and may be unreliable.

The invention also applies to the field of the return of vehicles after rental, in which it is desired to allow the automation of the preparation of a detailed inventory document.

The invention applies more generally to all automotive trades where the need to check the cosmetic condition of the vehicle arises. This generally involves any transfer of responsibility in the life of a motor vehicle.

Furthermore, the invention also applies to the field of the automatic detection of damage to motor vehicle bodywork, for example after an accidental event, such as a collision or a hailstorm.

To that end, document WO2006052684, System for measuring points on a vehicle during damage repair, is known in particular, which describes a system for measuring characteristic points on the bodywork with a view to its repair, by way of triangulation of mobile optical means, and by comparing the obtained values with predetermined reference values.

However, such a solution does not make it possible to detect all types of surface defect of a motor vehicle, and requires that reference data be acquired for all of the vehicles analyzed.

In addition, the concept of detection false positive is not included in this detection typology. The described system makes it possible to differentiate between damage and an exterior element on the bodywork that may be interpreted as damage.

SUMMARY OF THE INVENTION

Thus, there is a need for a more reliable solution that can be adapted to all types of motor vehicle regardless of their typology or the inspection condition.

What is proposed is an assembly for detecting defects over the entirety of the exterior and cosmetic aspect (bodywork, understructure, windshield, tires) on a bodywork of a motor vehicle comprising a gantry, of inverted U-shaped cross section, shaped to allow the passage of said motor vehicle in a longitudinal direction, from the rear of the gantry to the front of the gantry; said gantry comprising an inner surface extending transversely between two lateral free ends and comprising a light source suitable for illuminating, in a substantially uniform manner, the bodywork of the motor vehicle during its passage, said gantry comprising at least one opaque strip extending transversely over the entire length of the inner surface; said assembly comprising a plurality of cameras installed at a distance from the gantry, in at least one longitudinal direction, so as to capture images of the bodywork of the motor vehicle during its passage under the gantry, and a detection member suitable for receiving said images captured by said plurality of cameras and for detecting, according to these images, defects in the bodywork, on the one hand by analyzing the reflection of said opaque strip on the bodywork and, on the other hand, by directly recognizing, in said images, defects highlighted by observing the reflection of the light source on the bodywork.

Thus, it is possible to obtain a relatively simple structure that makes it possible to detect bodywork defects, both by deflectometric analysis and by direct analysis of images of the bodywork.

Advantageously and in a non-limiting manner, the inner surface has an arcuate shape in the transverse direction. Thus, it is possible to ensure relatively uniform illumination, by virtue of the absence of sharp angles on the inner surface.

Advantageously and in a non-limiting manner, the assembly comprises, on each side of the gantry, a rear attachment structure extending to the rear of the gantry, parallel to the longitudinal direction, and suitable for allowing the attachment of at least some of the plurality of cameras forming rear detection cameras, which are oriented so as to acquire images of the side and rear faces of the motor vehicle as it passes through said gantry. Thus, it is possible to easily acquire images of the side and rear portions of the bodywork of the motor vehicle with, in particular, reflection of the strip forming a deflectometric line on the bodywork, using relatively conventional optics, which do not require, in particular, a particularly short focal length.

Advantageously and in a non-limiting manner, the assembly comprises, on the upper portion of the gantry, one attachment structure for a mirror, mounted in line with said gantry, and another attachment structure for attaching cameras of the plurality of cameras forming upper cameras, which are oriented parallel to the longitudinal axis in the direction of the mirror, said mirror having an angle suitable for allowing the reflection, toward said upper cameras, of an image of the upper portion of the motor vehicle as the latter passes through said gantry. Thus, it is possible to easily acquire images of the upper portion of the motor vehicle, comprising the hood and the roof, with a relatively low gantry, by virtue of the distance effect obtained via the recurvature of the optical beam. Thus, it is possible to use relatively inexpensive camera optics while ensuring a relatively optimal acquisition quality with respect to the ranges of variability between the hood and the roof as well as various types of vehicle. This makes it possible to be able to use lenses without autofocus and with a region of sharpness allowing the variability in height of the entirety of said particular vehicle to be encompassed.

Advantageously and in a non-limiting manner, the assembly comprises a front attachment structure, extending to the front of the gantry, parallel to the longitudinal direction, and suitable for allowing the attachment of at least some of the plurality of cameras forming front detection cameras, which are oriented so as to acquire images of the front of the vehicle as it passes through said gantry. Thus, it is also possible to obtain images of the front of the vehicle and of the side fenders.

Advantageously and in a non-limiting manner, the assembly comprises a removable module intended to be installed on the ground, in the vicinity of the gantry, and comprising at least two lower cameras, oriented at an angle of substantially 20° to 90°, and intended to allow the acquisition of images of the understructure of the motor vehicle. Thus, it is also possible to obtain images of the understructure of the motor vehicle in a relatively straightforward manner.

Advantageously and in a non-limiting manner, the assembly comprises a light isolation device, forming a longitudinal opaque arch for passage of the motor vehicle, extending to the front and/or to the rear of the gantry. Thus, it is possible to optimize the detection of defects, by decreasing the risk of light interference from outside the assembly. This allows the creation of a standardized capture environment.

Advantageously and in a non-limiting manner, the plurality of cameras comprises high-speed or medium-speed cameras, making it possible to acquire the images for analyzing the reflection of said opaque strip on the bodywork, and high-resolution cameras for acquiring the images that are suitable for recognizing defects on the bodywork.

Advantageously and in a non-limiting manner, the assembly comprises at least one detection member for the motor vehicle, designed to control the activation of said light source of the gantry as a motor vehicle approaches the gantry. Thus, it is possible to optimize the power consumption of the gantry and to reduce the heating of the electronic components of the light source by selecting illumination periods according to the presence or the approach of a motor vehicle.

Advantageously and in a non-limiting manner, the detection member comprises a depth sensor oriented in the longitudinal direction to the rear of the gantry so as to detect the approach of a motor vehicle. Thus, it is possible to detect the approach of a motor vehicle in a relatively straightforward manner and trigger capture sequences according to the position of the vehicle. Thus, capture is standardized with one capture every X centimeters and this makes it possible to deal with variabilities in forward motion (non-linear speed, stopping of the vehicle, etc.)

Advantageously and in a non-limiting manner, the light source is formed of a matrix array of light-emitting diodes covered with a translucent wall. Thus, it is possible to obtain powerful and uniform illumination with low power consumption and relatively high reliability.

Advantageously and in a non-limiting manner, the matrix array of light-emitting diodes is made of a longitudinal succession of strips of LED tape which are secured, for example glued, transversely to the inner surface. Thus, it is possible to obtain an LED matrix array that is relatively powerful and relatively straightforward to maintain.

BRIEF DESCRIPTION OF THE DRAWINGS

Other peculiarities and advantages of the invention will become apparent from reading the description provided below of one particular embodiment of the invention, given by way of non-limiting indication, with reference to the appended drawings, in which:

FIG. 1 is a view of an assembly for detecting defects on a bodywork of a motor vehicle according to one embodiment of the invention;

FIG. 2 is another view, from the rear of the gantry, of an assembly according to the embodiment of FIG. 1;

FIG. 3 is a detail view of a right-hand rear structure of an assembly according to the embodiment of FIG. 1;

FIG. 4 is a side view of the assembly, at the rear portion of the gantry, according to the embodiment of FIG. 1;

FIG. 5 is a simplified side view of the assembly, without the external camera and mirror structures, showing in particular the removable module for the understructure of the motor vehicle, the detection member and the light isolation device;

FIG. 6 is a schematic side view of the camera structures on the right-hand side of the gantry of the assembly according to the embodiment of the invention;

FIG. 7a is one schematic view, face on from the rear portion, of one alternative embodiment of the invention, comprising a movable deflectometry strip; and FIG. 7b is another schematic view, from the side, of the embodiment of the invention according to FIG. 7a.

DESCRIPTION OF PREFERRED EMBODIMENTS

FIGS. 1 to 6 relate to the same embodiment of the invention and will be commented on at the same time.

An assembly 1 for detecting defects on a bodywork of a motor vehicle 20 comprising a gantry 10, a plurality of cameras 30-45 and a detection member, not shown.

What is meant by bodywork of the motor vehicle 20 is the exterior sheet-metal parts of the motor vehicle; the invention aims to detect bodywork or paintwork defects, for example in the context of quality control before leaving the factory or of checking the condition of the motor vehicle in the context of a rental return.

However, the invention is also suitable for detecting defects on the windows and windshield of the motor vehicle, and on the side mirrors, as well as defects on the understructure of the motor vehicle. However, for the sake of brevity of the description, reference will be made only to the term bodywork.

In this invention, the gantry 10 is installed so as to be stationary on the ground. The motor vehicle passes through the gantry, either by driving or, in particular in the context of a production line, by translation of the vehicle on a conveyor.

The gantry 10 forms a frame of inverted-U cross section, shaped to allow the passage of said motor vehicle 20 in a longitudinal direction X, from the rear 101 of the gantry 10 to the front 102 of gantry 10.

To that end, the gantry 10 has a height of between 2 meters and 5 meters, here 2.50 meters so as to allow the passage of a passenger motor vehicle.

The gantry 10 comprises an inner surface 11, here in the form of an arch, extending transversely along the transverse axis Y, and extending between two lateral free ends 111, 112.

In other words, the inner surface 11 forms an interior skin of the gantry 10.

The two lateral free ends 111, 112 may rest on the ground, forming a stand for the inner surface 11 of the gantry 10, or may, according to one alternative implementation, rest on feet so as to be held off the ground.

The inner surface 11 comprises a light source 12 suitable for illuminating the bodywork of the motor vehicle 20 in a substantially uniform manner as it passes under the gantry 10.

The arched shape of the gantry 10 is advantageous in order to ensure uniform illumination on the bodywork. However, it is also possible to provide an inner surface 11 having sharp angles, for example matching the shape of the frame 103 of the gantry 10, which involves improved control of the lighting conditions.

The light source 12 is here a matrix array of light-emitting diodes, abbreviated to LEDs, produced in the form of a succession of LED strips, which are mounted against the inner surface 11, parallel to the transverse axis Y, along the arch formed by the inner surface 11, over the entire length of this arch.

The LED strips are spaced from one another, along the longitudinal axis X, by a space of between 30 mm and 100 mm, for example by substantially 55 mm, over the entire longitudinal depth X of the inner surface 11, here over substantially 1.50 meters.

This LED matrix array is then covered with a wall of translucent plexiglass material, or any other suitable translucent material, making it possible to ensure surface smoothing of the illumination.

Thus, it is possible to obtain powerful and relatively uniform illumination making it possible to reliably illuminate the bodywork of a motor vehicle passing under the gantry 10.

An opaque strip 13 is attached to the light source 12, here the LED matrix array covered with the plexiglass wall, for example by adhesive.

This opaque strip 13 extends over the light source 12, along the arch formed by the inner wall 11, over the entire length of the arch, so as to form a deflectometric line 13.

Specifically, the objective of this opaque strip 13 is to allow the reflection thereof on the bodywork of the vehicle passing under the gantry 10 in contrast with the strong illumination produced by the light source 12.

The technique of deflectometry consists in observing the deformation of a line 13 reflecting on the bodywork of a motor vehicle 20, which makes it possible to detect a dent or a defect in the sheet metal in a relatively straightforward manner. When the sheet metal is dented, the reflected line 13 tends to curve, defining a characteristic shape that is substantially a swirl around the damaged region.

The opaque strip 13 is here installed substantially in the middle of the inner surface 11, in the longitudinal direction X.

The invention is not limited to a single opaque strip 13, and it is possible, for example, to provide a plurality of opaque strips 13 spaced longitudinally apart from one another.

According to one preferred embodiment of the invention, the inner surface 11 features a plurality of parallel opaque strips 13, of different widths, spaced slightly apart from one another, for example with a spacing smaller than or equal to the width of the narrowest of the strips, so as to create a visual signature that is easily recognizable during analysis by deflectometry, in particular when this analysis is implemented by computer.

The opaque strips may be installed at a plurality of positions of the gantry, for example, as shown in FIG. 1, in one group in the center of the gantry, in the direction from rear to front, and in another group in the vicinity of the front of the gantry.

Another group of strips could be installed, in addition to or instead of the groups already present, for example in the vicinity of the rear of the gantry.

The assembly 1 also comprises a plurality of cameras 30-45 that are installed so as to capture images of the bodywork of the motor vehicle 20 passing under the gantry 10.

The invention is not limited to one defined arrangement of cameras in the vicinity of the inner surface 11, as described below, and any arrangement of cameras 30-45 suitable for capturing images of the bodywork, and in particular the reflection of the line 13 on the bodywork of the motor vehicle 20, in particular the portions of the motor vehicle 20 directly in line with the light source 12, may be provided.

In this embodiment of the invention, the assembly 1 comprises, on each side of the gantry 10, a rear attachment structure 2, 3, respectively left 2 and right 3, extending to the rear of the gantry 10, parallel to the longitudinal direction X.

Each rear attachment structure, respectively left 2 and right 3, is suitable for allowing the attachment of cameras, called rear cameras 31-36, which are intended to capture images of the bodywork of the motor vehicle 20 on the left-hand side and on the right-hand side, respectively, and the rear of the motor vehicle over its rear-left and rear-right portion, respectively.

In order to ensure better acquisition of images of the bodywork of the motor vehicle, each rear attachment structure 2, 3 comprises a plurality of cross members 301, 302, here two cross members 301, 302 superposed at distinct heights, here, by way of non-limiting example, 50 cm from the ground and 1.5 m from the ground, respectively, and an upright 303, as shown in FIG. 3, so that each camera may acquire an image of a portion of the bodywork of the motor vehicle.

However, the number of cross members, and the number of uprights, may be increased depending on the need to position cameras at various distances from the gantry, taking into account the optical constraints of the cameras used, in particular according to their focal length and their field of view.

The various heights for positioning the rear cameras, on the cross members 301-302 or on the upright 303, and the number of cameras required, are defined by the focal lengths and the fields of view of the cameras used.

The objective is to ensure that the entire height of the bodywork is in the field of view of the cameras of each respective rear structure 2, 3, with sufficient sharpness to allow, in particular, algorithmic detection of bodywork defects.

The rear cameras are here distanced, in the longitudinal direction X, from the proximal edge 115 of the inner surface 11 by a distance of between 50 cm and 1 m.

Each camera of each rear structure 2, 3 is oriented so as to acquire images of the rear of the vehicle as it passes through said gantry.

The cameras are oriented and distanced from the proximal edge 115 of the inner surface 11 according to their focal length and to their field of view so as to capture a portion of the bodywork of a motor vehicle 20 in a relatively sharp manner.

Each rear structure 2, 3 comprises, in particular, two monochrome high-resolution cameras, here with a resolution, by way of example, of 4024×3036 pixels, and four high-speed cameras, here with a resolution, by way of example, of 1920×1200 pixels of lower resolution, this making it possible to obtain optimal results for the various types of detection implemented, by deflectometry and by direct analysis of images of the bodywork.

By way of advantageous example, and as shown in the figures, all coincident structures are installed on the assembly 1:

- 12 high-speed cameras including four for inspecting the right-hand side of the vehicle, four for inspecting the left-hand side of the motor vehicle and four for inspecting the hood and the roof of the motor vehicle;
- eight high-resolution cameras including two for inspecting the rear-left of the vehicle, two for inspecting the rear-right, two for inspecting the front-right and two for inspecting the front-left of the motor vehicle.

There are also two high-speed cameras for the removable module 52 for analyzing the understructure of the motor vehicle.

Thus, the rear structure comprises, for each side, right or left, with reference to FIG. 3, an upright comprising four high-speed cameras 31-33, 36, and two cross members 301, 302, each comprising a high-resolution camera 35, 37.

In other words, 20 cameras may be installed on the gantry, which makes it possible to obtain a reliable and robust analysis.

The high-speed cameras, or, according to one alternative, medium-speed cameras, make it possible to perform the image acquisition for the analysis by deflectometry, in order to detect "POCs", in other words small dents in the sheet metal, such as impacts by stones or gravel.

Regarding the high-resolution cameras, or, according to one alternative, medium-resolution cameras, they allow direct image processing to be performed in order to detect, in particular, scratches and paint defects.

The installed high-speed and high-resolution cameras are, in this embodiment, monochrome cameras, so as to decrease the size of the digital storage for the images, but may also be color cameras.

The quality and frequency of acquisition of the cameras may be selected according to the desired granularity for the detection of bodywork defects.

The assembly 1 also comprises, similarly to the rear structures 2, 3, front structures 60, such as that shown for the right-hand side 60 in FIG. 6. However, the invention comprises two front structures 60, one for the right-hand side 60 and another for the left-hand side, not shown.

This front structure 60 comprises two cross members 60 to each of which is attached a camera 61, 62, intended to view a front-side portion of the motor vehicle, the front of the motor vehicle and the front fender. To that end, the front structures 60 do not need to be of substantial height in the context of passenger vehicles, for which the front of the vehicle is generally relatively low.

However, in the case of a gantry 10 intended to detect defects on high vehicles, such as truck trailers, the front structure 60 may be raised, as described for the rear structures 2, 3, in order to acquire images for the entire front face of the motor vehicle.

The assembly 1 also comprises, on the upper portion 108 of the gantry 10, an attachment structure for a mirror 6, extending to the front 102 of the gantry, and another attachment structure, in line with the gantry, for attaching upper cameras 41-43, which are oriented substantially parallel to the longitudinal axis X in the direction of the mirror 6.

In this embodiment, four upper cameras are installed, here monochrome cameras, for example high-speed cameras.

The mirror 6 extends over a transverse length Y that is substantially equal to the transverse length of the inner wall 11.

In this embodiment, the mirror 6 is installed substantially 50 cm forward, in the longitudinal direction X, of the gantry 10 and has an angle of substantially 40° with respect to the vertical axis Z.

The mirror 6 is oriented such that it defines an angle that makes it possible to reflect the image of the upper portion of the motor vehicle 20 toward the upper cameras 41-43 as the vehicle passes under the gantry 10.

Thus, it is possible to obtain a sufficient distance with respect to the cameras to acquire images of the roof of a motor vehicle, with a relatively low gantry.

This makes it possible in particular to use relatively inexpensive cameras with a relatively long focal length.

The assembly 1 also comprises a removable module 52, not shown, intended to rest on the ground, in this embodiment on the ground under the gantry 10, and comprising at least one camera 53.

However, according to some alternative implementations, the removable module 52 may be installed in another position on the ground, for example at the front or at the rear of the gantry 10.

The camera 53 of the removable module 52 is oriented at an angle of substantially 20° to 90° with respect to the ground, and allows the acquisition of images of the understructure of the motor vehicle 20 as it passes under the gantry 10.

In particular, a color camera is favored for the removable module, because analyzing the color of the understructure makes it possible to detect problems such as liquid leaks.

According to one particular embodiment of the invention, the assembly also comprises a light isolation device 51, in the form of a longitudinal opaque arch, extending to the rear 101 and/or to the front 102 of the gantry.

In other words, the light isolation device 51 forms a tunnel into which the motor vehicle enters, creating a dark zone, making it possible to better control the lighting under the gantry.

In this embodiment, the gantry 10 comprises two opaque tarpaulins 51, mounted as a tunnel to the rear 101 and to the front 102 of the gantry 10, over a length of between 1 m and 5 m, for example 3 m, on each side.

The assembly 1 also comprises, with reference to FIG. 5, a detection member 50 for the motor vehicle, controlling the activation of said light source 11 of the gantry 10 as a motor vehicle approaches the gantry.

Thus, it is possible to ensure selective activation of the light source, making it possible in particular to decrease the power consumption and to limit the heating of the electronic components, in particular of the LEDs used.

Here, the detection member is a 3D depth sensor, which detects the approach of a motor vehicle and controls the activation of the gantry and the triggering of the cameras.

The 3D sensor may be installed at height 50, on the ground at the front 50', or on the ground at the rear 50" of the gantry so as to detect the approach of a motor vehicle; the positioning of the 3D sensor being free, depending on the structural constraints of each installation.

Each camera may be controlled for image acquisition according to the forward motion of the vehicle detected by the 3D sensor. Thus, it is possible to regulate the number of images acquired according to the speed of forward motion of the motor vehicle.

According to one particular implementation of the invention, the detection member may comprise a lidar, from the acronym "light detection and ranging" or "laser detection and ranging", remote sensor.

In particular, the lidar remote sensor is mounted at the front 102 of the gantry 10, on an upper structure, spaced with respect to the front of the gantry 10 by a distance suitable for the lidar detection beam to cover the interior of the gantry 10 so as to detect the entry and forward motion of a motor vehicle through this gantry 10.

For example, the lidar remote sensor may be installed at a longitudinal distance of approximately 1 m to 2 m from the front face of the gantry.

This particular positioning of the lidar is not, however, the only conceivable position, a person skilled in the art being able to position the remote sensor at any suitable location so as to measure the forward motion of the vehicle under the gantry.

The invention is not only limited to remote sensing by lidar, but may comprise other types of remote sensing, such as a radar.

The detection member, such as the lidar, the radar or the 3D sensor, is not limited only to detecting the arrival of a motor vehicle in the vicinity of or under the gantry 10. They additionally make it possible to synchronize the frequency of acquisition of the various cameras according to the speed of forward motion of the motor vehicle, in order to obtain optimal acquisition, thus avoiding over-acquisition of images, which has the disadvantage of cluttering up the storage memory and decreasing detection performance, or under-acquisition, which decreases the quality of detection.

Lastly, the assembly comprises a detection member, here a computer comprising means for acquiring and storing the images from the cameras, and calculation means.

The detection member then receives the images captured by the plurality of cameras and implements a detection method by analyzing the reflection of said opaque strip 12 on the bodywork, which technique is called deflectometry, and a detection method by directly recognizing in said images, defects on the bodywork.

What is meant by direct recognition is an image analysis method, or a machine learning method, suitable for automatically recognizing, and without deflectometric analysis, defects in the image of a bodywork.

Sometimes, problems with deflectometry detection occur on the rear face of the motor vehicle, in particular when this face has a vertical wall. Specifically, the reflection of the line on this face cannot be correctly projected during the passage of the motor vehicle 20 under the gantry 10, certain regions of the vertical rear face of the motor vehicle not reflecting the line.

To that end, with reference to FIGS. 7a and 7b, a movable strip 700 in the form of an arch is installed, substantially matching the curvature of the inner surface 11, mounted on two longitudinal rails 701, 702 extending on either side of the inner surface 11 of the gantry 10.

The movable strip 700 is then shaped so as to be able to translate along the two longitudinal rails between the two transverse edges 115, 116 of the gantry.

The movable strip 700 is controlled in translation along the longitudinal direction X, so as to move the position of the movable strip 700 according to the position of the motor vehicle 20 under the gantry 10 and according to the speed of forward motion of the motor vehicle 20.

The invention claimed is:

1. An assembly for detecting defects on a bodywork of a motor vehicle, its understructure and its tires, comprising a gantry, of inverted U-shaped cross section, shaped to allow the passage of said motor vehicle in a longitudinal direction, from the rear of the gantry to the front of the gantry; said gantry comprising an inner surface extending transversely between two lateral free ends and comprising a light source suitable for illuminating, in a substantially uniform manner, the bodywork of the motor vehicle during the passage of the motor vehicle through the gantry, said gantry comprising at least one opaque strip extending transversely over the entire length of the inner surface; said assembly comprising a plurality of cameras installed at a distance from the gantry, in at least one longitudinal direction, so as to capture images of the bodywork of the motor vehicle during its passage under the gantry, and a detection member suitable for receiving said images captured by said plurality of cameras and for detecting, according to these images, defects in the bodywork by analyzing the reflection of the opaque strip on the bodywork and by directly recognizing, in said images, defects highlighted by the reflection of the light source on the bodywork;

said assembly comprising, on each side of the gantry, a rear attachment structure extending to the rear of the gantry, parallel to the longitudinal direction, and allowing the attachment of at least some of the plurality of cameras forming rear detection cameras, which are oriented so as to acquire images of the side and rear faces of the motor vehicle as it passes through said gantry, wherein each rear attachment structure includes an upright member supporting a group of vertically spaced rear detection cameras from the plurality of rear detection cameras, and wherein each rear attachment structure includes a plurality of vertically spaced cross members each extending toward the gantry from the upright member and each supporting at least one rear detection camera from the plurality of rear detection cameras.

2. The detection assembly as claimed in claim 1, wherein the inner surface has an arcuate shape in the transverse direction.

3. The detection assembly as claimed in claim 1, further comprising, on the upper portion of the gantry, one attachment structure for a mirror, extending to the front of the gantry, and another attachment structure for attaching cameras of the plurality of cameras forming upper cameras, which are oriented substantially parallel to the longitudinal axis in the direction of the mirror, said mirror having an angle that allows the reflection, toward said upper cameras, of an image of the upper portion of the motor vehicle as the latter passes through said gantry.

4. The detection assembly as claimed in claim 1, further comprising a front attachment structure, mounted in line with the gantry, and for allowing the attachment of at least some of the plurality of cameras forming front detection cameras, which are oriented so as to acquire images of the front of the motor vehicle as it passes through said gantry.

5. The detection assembly as claimed in claim 1, further comprising a removable module intended to be installed on the ground, under the gantry, and comprising at least one lower camera, oriented at an angle relative to the horizon of substantially 20° to 90°, and intended to allow the acquisition of images of the understructure of the motor vehicle.

6. The detection assembly as claimed in claim 1, further comprising a light isolation device, forming a longitudinal opaque arch for the passage of the motor vehicle, extending to the rear and/or to the front of the gantry.

7. The detection assembly as claimed in claim 1, wherein the plurality of cameras comprises at least one camera, making it possible to acquire the images for analyzing the reflection of said opaque strip on the bodywork, and at least one camera for acquiring the images for directly recognizing defects on the bodywork.

8. The detection assembly as claimed in claim 1, further comprising at least one detection member for the motor vehicle, designed to control the activation of said light source of the inner surface of the gantry as a motor vehicle approaches the gantry.

9. The detection assembly as claimed in claim 8, wherein the detection member comprises a depth sensor or a lidar remote sensor, oriented in the longitudinal direction to the rear of the gantry so as to detect the approach of a motor vehicle.

10. The detection assembly as claimed in claim 1, wherein the light source is formed of a matrix array of light-emitting diodes covered with a translucent wall.

11. The detection assembly as claimed in claim 10, wherein the matrix array of light-emitting diodes is made of a longitudinal succession of strips of LED tape which are secured, for example glued, transversely to the inner surface.

* * * * *